Dec. 2, 1947. S. B. HASELTINE 2,431,750
LOCKING MEANS FOR RAILWAY CAR HAND BRAKES
Filed Oct. 22, 1945
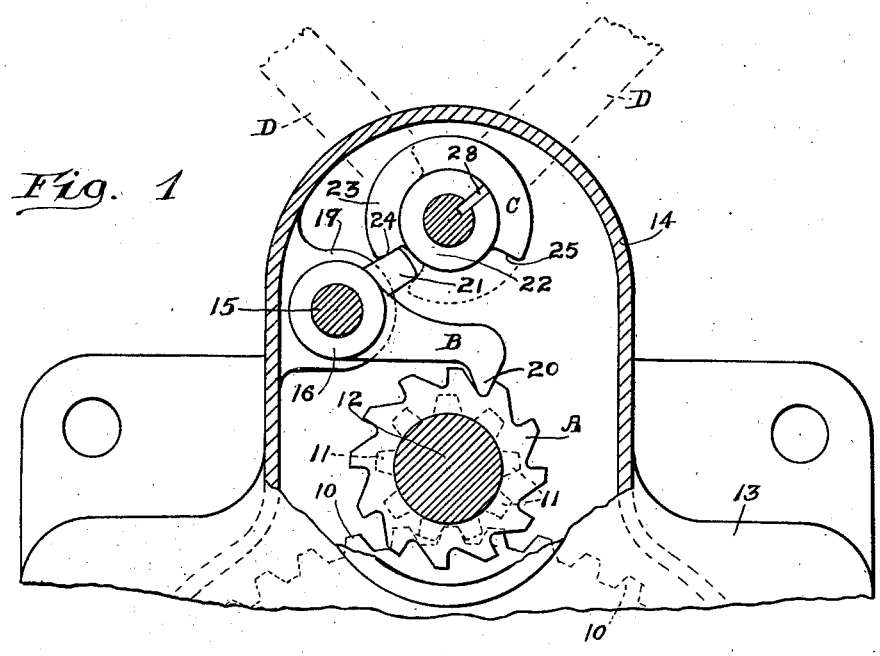
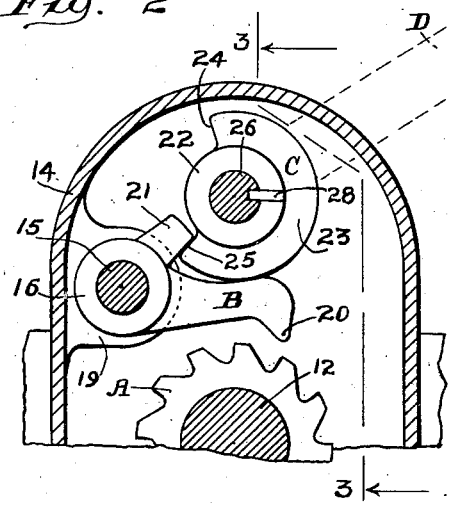
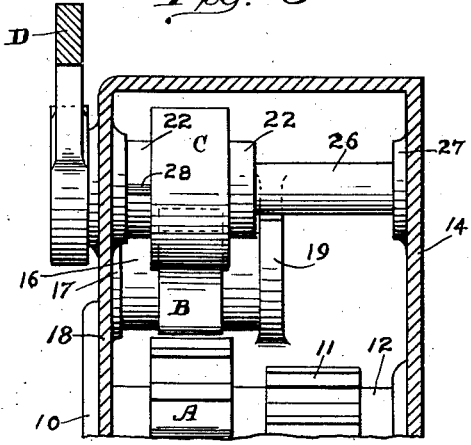
Inventor:
Stacy B. Haseltine:
By Henry Fuchs.
Atty.

Patented Dec. 2, 1947

2,431,750

UNITED STATES PATENT OFFICE 2,431,750

LOCKING MEANS FOR RAILWAY CAR HAND BRAKES

Stacy B. Haseltine, La Grange, Ill., assignor to W. H. Miner, Inc., Chicago, Ill., a corporation of Delaware Application October 22, 1945, Serial No. 623,727

3 Claims. (Cl. 188—81.1)

This invention relates to improvements in hand brakes for railway cars and more particularly to such brakes of the power multiplying gear type.

One object of the invention is to provide in a hand brake mechanism of the character indicated simple, efficient, and reliable means for locking the brake mechanism in applied position, comprising a ratchet member and a cooperating locking dog, wherein the dog is actuated by a trip mechanism, which is manually controlled and is positively moved into and out of engagement with the ratchet member in applying and releasing the brakes.

A more specific object of the invention is to provide a brake mechanism as set forth in the preceding paragraph, wherein the dog is of the pivoted type and the trip element is lever operated and engages a lug on the dog to positively throw the dog respectively into and out of engagement with the ratchet member, and the weight of the lever holds the dog either in operative engagement with the ratchet member or disengaged therefrom, and wherein positive stop means is provided for limiting the throw of the lever and the dog when the latter is disengaged from the ratchet wheel.

Other objects of the invention will more clearly appear from the description and claims hereinafter following.

In the drawing forming a part of this specification, Figure 1 is a front elevational view of the upper portion of a gear driven, power multiplying hand brake mechanism, illustrating my improvements in connection therewith, the top portion of the housing and the mechanism contained therein being shown in vertical section. Figure 2 is a view similar to Figure 1, partly broken away, showing the parts in brake releasing position. Figure 3 is a transverse, vertical sectional view, corresponding substantially to the offset line 3—3 of Figure 2.

In the drawing, my improvements are illustrated in connection with a well-known type of gear driven, power multiplying hand brake mechanism, in which the usual brake chain is wound on a brake drum, not shown, rotatable with a relatively large gear 10 driven by a pinion 11 fixed to a shaft 12, which is actuated in a well-known manner by the usual hand wheel, not shown. As is common practice, the operating parts of the hand brake mechanism are enclosed in a housing 13.

In carrying out my invention, I provide broadly a ratchet wheel A rotatable with the pinion 11; a pivoted locking dog B cooperating with the ratchet wheel; a trip element C; and an operating trip lever D for actuating the trip element.

The ratchet wheel A, locking dog B, and the trip element C are contained within an upstanding chamber portion 14 of the housing 13.

The ratchet wheel A is of the usual type and is fixed to the shaft 12, which carries the pinion 11, and is rotated by the hand wheel.

The locking dog B, which cooperates with the ratchet wheel A, is pivotally supported above said wheel by a pivot pin 15, which extends through a cylindrical hub portion 16 at the inner end of the dog. The pivot pin 15 is arranged horizontally in parallelism with the axis of rotation of the ratchet wheel and has its opposite ends fixed in an inwardly projecting boss 17 on the front wall 18 of the portion 14 of the housing and an inwardly projecting web 19 on the side wall of said portion 14. At the outer end thereof, that is, the end opposite to the pivoted end, the dog B is provided with a tooth 20 cooperating with the teeth of the ratchet wheel A. The hub portion 16 of the dog B is provided with a relatively heavy, outstanding, radial lug 21 for a purpose hereinafter pointed out. The lug 21 lies in the same vertical plane as the main body portion of the dog B, but is angularly spaced therefrom.

The trip element C comprises a cylindrical hub portion 22 and an arc-shaped flange 23 projecting from said hub portion. The flange 23 lies in a plane at right angles to the axis of rotation of the trip element. As shown in Figures 1 and 2, the flange 23 is cut away at one side of the hub portion 22, that is, it extends around the hub portion for slightly more than 180 degrees, thus presenting stop faces or shoulders 24 and 25 at its ends. The stop shoulders 24 and 25 present flat faces which are substantially radially disposed with respect to the axis of rotation of the trip element and cooperate with opposite sides of the lug 21 of the dog B. The trip element C is supported by a horizontal shaft 26, which extends through the hub portion 22 and the front wall 18 of the chamber portion 14, being rotatably supported in a suitable bearing opening in said wall. The inner end of the shaft 26 is suitably journaled in an inwardly projecting boss 27 on the rear wall of the chamber portion 14. At the outer end, the shaft 26 carries the upstanding operating trip lever D, which is fixed thereto in any suitable well-known manner. The trip element C is fixed to the shaft 26, a key 28 being preferably provided. The shaft 26 is spaced such a distance from the pivotal axis of the dog B that the lug 21 of the dog lies in the path of movement of the stop shoulders 24 and 25 of the trip element C, and the arcuate flange 23 of the trip member is in alignment with the main body portion of the dog B and projects such a distance from the hub portion 22 that it is engaged by the back or upper side of the dog when it is completely disengaged from the ratchet wheel A, thus acting as a limiting stop for the dog.

The operation of my improved hand brake mechanism is as follows: In applying the brakes, the ratchet wheel is rotated in clockwise direction, as viewed in Figure 1, the dog B ratcheting over the teeth of the same, being yieldingly held in engagement with the teeth by the action of gravity on the dog and the weight of the lever D, which, at this time, is in the dotted line position shown at the left hand side of Figure 1. As will be evident, the lever in its unbalanced position tends to rotate the trip element C in contra-clockwise direction and the latter, through engagement with the lug 21 of the dog, presses the same against the ratchet wheel. To release the brakes, the lever D is swung to the right, thus bringing the same to the dotted line position shown at the right of Figure 1. In this last named position, the shoulder 25 of the trip element C engages the lug 21 of the dog B and upon relieving the pressure on the tooth of the dog by slightly tightening the brakes, that is, rotation of the ratchet wheel in clockwise direction, the weight of the lever D in its overbalanced position automatically disengages the dog from the ratchet member, as shown in Figure 2. The dog B may also be forcibly disengaged from the ratchet wheel by manually swinging the lever D to the position shown in Figure 2 without the slight tightening of the brakes. To reengage the dog with the ratchet wheel, the lever D is swung from the dotted line position shown in Figure 2 to the left hand dotted line position shown in Figure 1, thereby engaging the shoulder 24 of the trip element C with the lug 21 of the dog, forcing the latter to swing downwardly into engagement with the teeth of the ratchet wheel.

I claim:

1. In a hand brake mechanism, the combination with a member adapted to be rotated to tighten the brakes; of a ratchet wheel rotatable with said member; a locking dog pivoted at its inner end and having a tooth at its outer end engageable with said ratchet wheel; an outstanding lug on said dog at the pivoted end thereof; and a rotary trip element having circumferentially spaced shoulders respectively engageable with said lug to engage said dog with said ratchet wheel and disengage the same therefrom, said trip element being in the path of swinging movement of the dog and engageable thereby to limit movement of the same away from the ratchet wheel.

2. In a hand brake mechanism, the combination with a member adapted to be rotated to tighten the brakes; of a ratchet wheel rotatable with said member, said ratchet wheel being rotatable about a horizontal axis; a dog above said ratchet wheel, said dog being pivoted at one end and having a tooth at the other end engageable with said ratchet wheel; a radially projecting lug on said dog at the pivoted end thereof; a rotary trip element, mounted for rotation about a horizontal axis above said ratchet wheel; an arcuate flange on said trip element extending partly around the same, opposite ends of said flange presenting circumferentially spaced stop shoulders respectively engageable with said lug of the dog to move the latter into and out of engagement with the ratchet wheel, said flange of said element being swingable into the path of upward movement of said dog when the dog is being moved out of engagement with the ratchet wheel to positively limit upward movement of said dog.

3. In a hand brake mechanism, the combination with a member adapted to be rotated to tighten the brakes; of a ratchet wheel rotatable with said member, said ratchet wheel being rotatable about a horizontal axis; a dog pivotally mounted above said ratchet wheel, said dog having toothed engagement with said ratchet wheel; a radially projecting lug on said dog at the pivoted end thereof; a rotary trip element mounted above said ratchet wheel for rotation about a horizontal axis; an operating lever for actuating said trip element; an arcuate flange on said trip element extending partly around the same, one end of said flange providing a stop shoulder engageable with said lug to swing the dog toward said ratchet wheel when the trip element is rotated in one direction, and the other end of said flange providing a second stop shoulder engageable with said lug to swing the dog away from said ratchet wheel when the trip element is rotated in a reverse direction, said flange lying in the path of upward swinging movement of said dog when said second named shoulder is in engagement with the lug of the dog, thereby limiting upward swinging movement of the dog and movement of the operating lever in releasing direction.

STACY B. HASELTINE.

REFERENCES CITED

The following references are of record in the file of this patent:

UNITED STATES PATENTS

| Number | Name | Date |
|---|---|---|
| 1,872,063 | Camp | Aug. 16, 1932 |